US009088511B2

(12) United States Patent
Perlman

(10) Patent No.: US 9,088,511 B2
(45) Date of Patent: Jul. 21, 2015

(54) MULTI-HOP ERROR RECOVERY

(71) Applicant: Intel Corporation, Santa Clara, CA (US)

(72) Inventor: Radia Perlman, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 13/681,136

(22) Filed: Nov. 19, 2012

(65) Prior Publication Data

US 2014/0140348 A1    May 22, 2014

(51) Int. Cl.
*H04L 12/721* (2013.01)
*H04L 12/703* (2013.01)

(52) U.S. Cl.
CPC ................ *H04L 45/26* (2013.01); *H04L 45/38* (2013.01)

(58) Field of Classification Search
CPC ....................................................... H04L 47/11
USPC .......................... 370/252, 229, 235, 237, 231
See application file for complete search history.

(56) References Cited

U.S. PATENT DOCUMENTS

| | | | | |
|---|---|---|---|---|
| 6,771,601 | B1 * | 8/2004 | Aydemir et al. | 370/231 |
| 7,912,003 | B2 * | 3/2011 | Radunovic et al. | 370/329 |
| 8,493,867 | B1 * | 7/2013 | Cheriton | 370/236 |
| 2002/0069292 | A1 * | 6/2002 | Gaddis et al. | 709/238 |
| 2003/0229839 | A1 | 12/2003 | Wang et al. | |
| 2006/0045004 | A1 | 3/2006 | Charzinski et al. | |
| 2010/0265824 | A1 | 10/2010 | Chao et al. | |
| 2012/0008521 | A1 * | 1/2012 | Moncaster et al. | 370/252 |

FOREIGN PATENT DOCUMENTS

| | | |
|---|---|---|
| EP | 0696111 A2 | 2/1996 |
| EP | 0755139 A2 | 1/1997 |

OTHER PUBLICATIONS

Shreedhar, M and Varghese, G.. Efficient Fair Queuing Using Deficit Round-Robin, IEEE/ACM Transactions on Newtworking, Jun. 1996, vol. 4. No. 3.*

(Continued)

*Primary Examiner* — Brandon Renner
*Assistant Examiner* — Sasha Cintron Pacheco
(74) *Attorney, Agent, or Firm* — Law Office of R. Alan Burnett, P.S.

(57) ABSTRACT

Methods, apparatus and network architectures relating to the use of a Hop-by-Hop packet forwarding technique using "stepping stone" switches. The network architectures include use of stepping stone switches interspersed with non-stepping stone switches such as conventional network switches comprising network elements such switches, routers, repeaters, etc. The stepping stone switches are configured to route packets as multiplexed flows along tunneled sub-paths between stepping stone switches in a hop-by-hop manner with error recovery, as opposed to conventional routing under which packets are routed from a source to a destination using an arbitrary path or along a (generally) lengthy flow-based path. Accordingly, packets from a source endpoint are routed to a destination endpoint via multiple sub-paths connecting pairs of stepping stone switches, with each sub-path traversing one or more conventional switches and constituting a logical Hop in the Hop-by-Hop route.

23 Claims, 15 Drawing Sheets

(56) References Cited

OTHER PUBLICATIONS

Perlman et al., "Hierarchical Networks with Byzantine Robustness," Third International Conference on Communication Systems and Networks (COMSNETS), Jan. 4-8, 2011, IEEE Conference Publications, 11 pages.

International Search Report and Written Opinion Received for PCT Patent Application No. PCT/US2013/046693, mailed on Oct. 16, 2013, 9 pages.

* cited by examiner

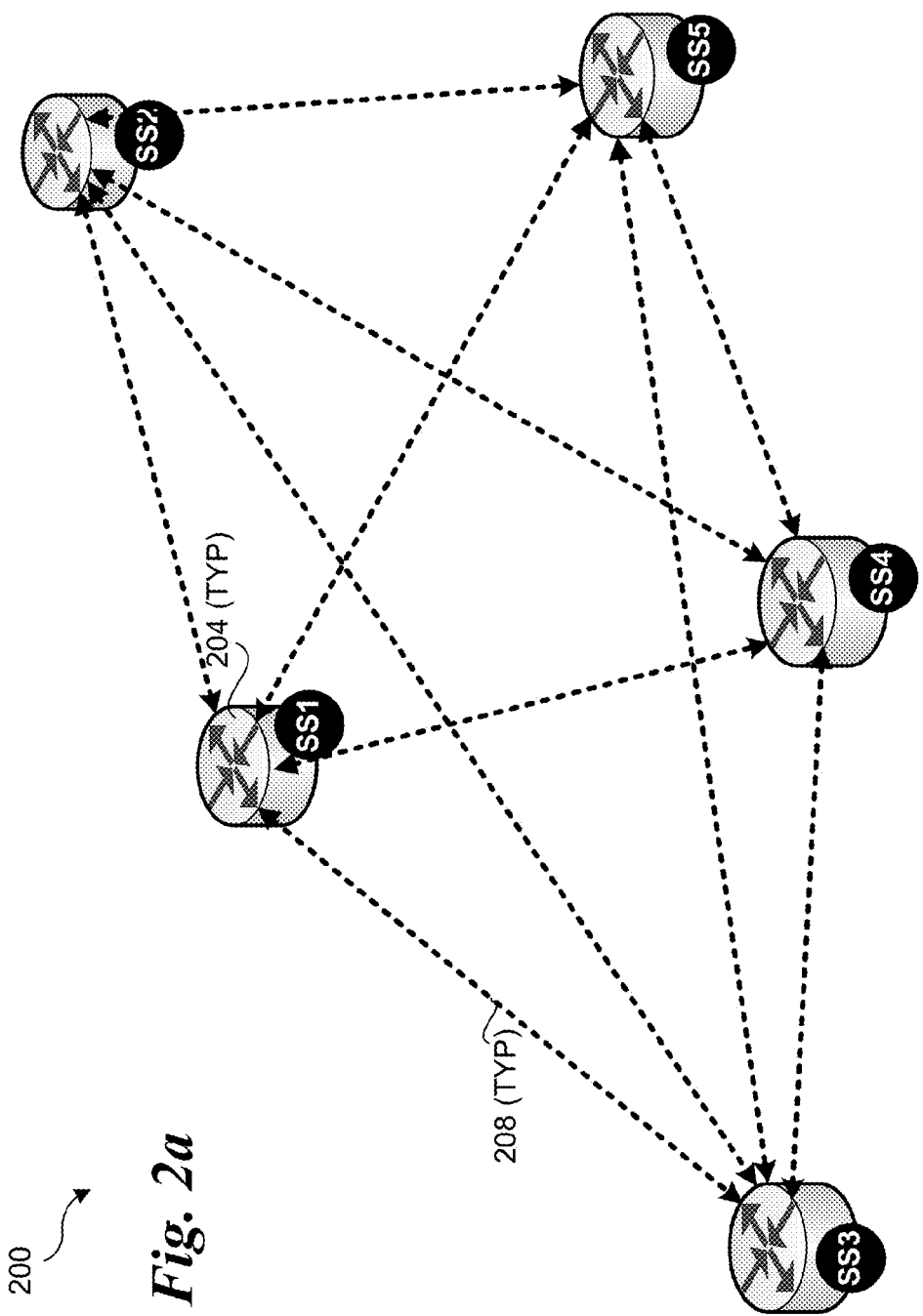

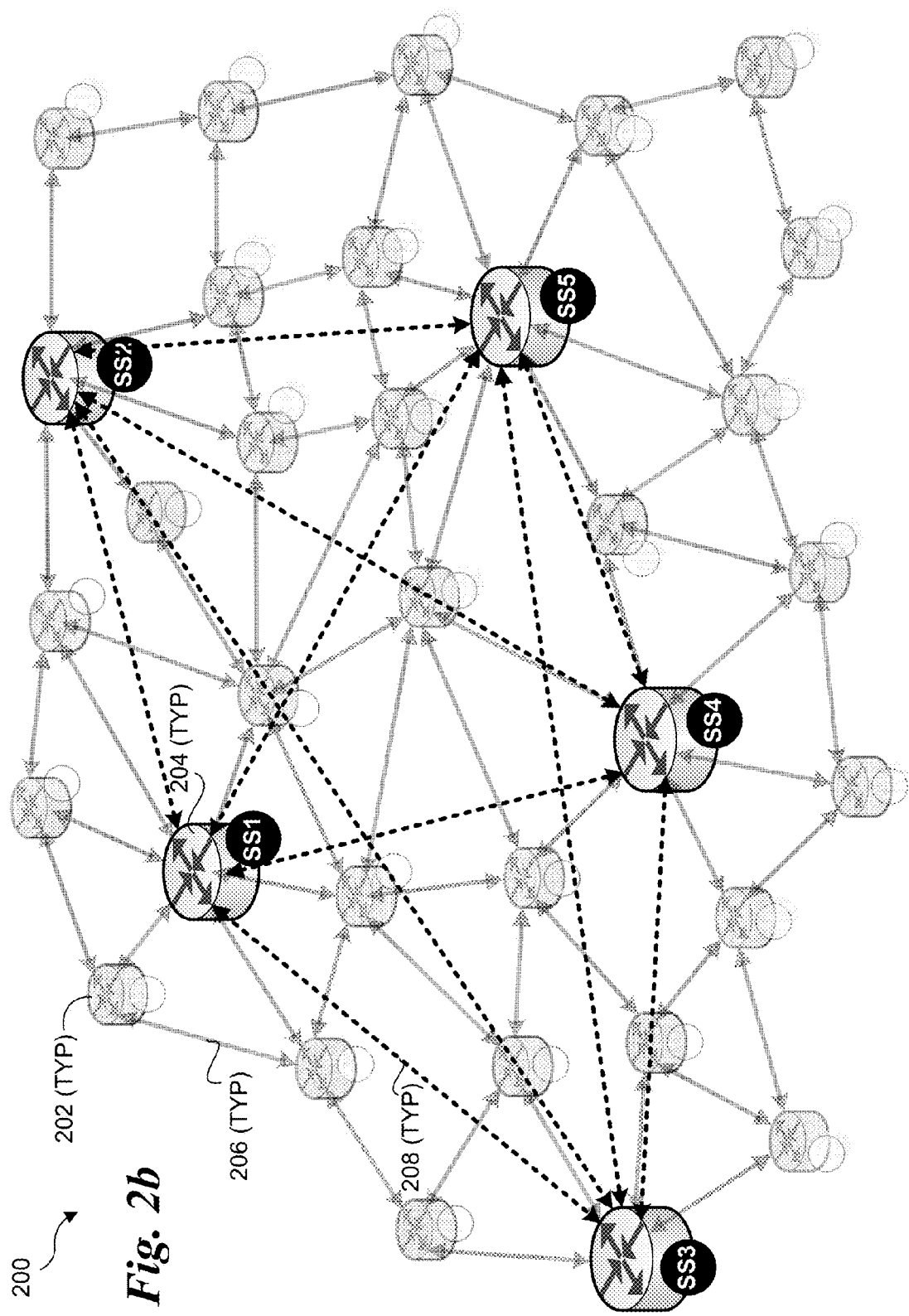

MULTI-HOP ERROR RECOVERY

FIELD OF THE INVENTION

The field of invention relates generally to computer networking and, more specifically but not exclusively relates to a network architecture and network switches supporting enhanced network performance using multi-hop forwarding with error recovery.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever increasing capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, and addition to the deployment of massive data centers to support these services which employ private network infrastructure. Additionally, the new generation (i.e., 4G) of mobile network data services is expected to significantly impact the utilization of land-line networks in the near future. The result of these and other considerations is that the utilization of computer networks is expected to continue to grow at a high rate for the foreseeable future.

FIG. 1 depicts a conventional computer network architecture 100 employing a plurality of switches 102 labeled 1-36 communicatively coupled to one another via links 104. A source computer 106 is coupled to switch 14 via an Internet Service Provider (ISP) network 108. On the other side of the network a destination computer 110 comprising an e-mail server is connected to switch 20 via an e-mail service provider (ESP) network 112.

Each of switches 1-35 includes a routing or forwarding table that is used to route/forward packets to a next hop based on various criteria, which typically includes the destination address. Under various routing protocols such as the Internet Protocol (IP), data is partitioned into multiple packets that are routed along a path between a source endpoint and a destination endpoint, such as depicted by source computer 106 and destination computer 110. In general, the path traversed by a given packet may be somewhat arbitrary, which is part of why the Internet is so robust. Since packets between endpoints can travel along different paths, when a network switch goes down or is taken offline, the routing tables for the other switches are updated to route packets along paths that do not include that switch.

FIG. 1 further illustrates an exemplary routing path that includes hops between switches 14, 15, 22, 23, 16, 17, 18, and 19. Of course, subsequent packets may be routed along different routes, depending on the classification of the traffic being transmitted between source computer 106 and a destination computer 110, as well as real-time network operating conditions and traffic handled by the various network switches.

In computer networks, packets may be lost due to due to various reasons, including bit errors, congestion, or switch failures. When a packet is lost on a path between a source and its destination, it typically needs to be retransmitted from the source. This has two problems. First, since the path from source to destination is reasonably long, it takes a long time for the source to find out that a packet has been lost. Second, the progress the packet made before getting dropped is wasted bandwidth.

On lossy links with many bit errors, hop-by-hop reliability is sometimes done. This means that when a first switch S1 is forwarding to a neighbor switch S2, S1 and S2 run a reliable protocol in which S1 holds onto each packet until it is acknowledged by S2 as being successfully received without errors, retransmitting packets that got lost or dropped. An example of such a protocol is High-Level Data Link Control (HDLC) or Digital Data Communication Message Protocol (DDCMP). This requires more complex and expensive switches, since it requires more buffers for S1 to hold onto packets until receiving an acknowledgement from S2.

Another approach to avoiding packet loss due to bit errors on links is to use error correcting codes so that a packet can be reconstructed, provided there are not too many bit errors. This has a lot of overhead, both in terms of extra checksum bits, and computation, and there is still the possibility that there are more errors than can be handled by the error correcting code.

Network congestion is currently addressed in one of two ways: dropping packets or implementing backpressure on incoming ports (typically on a per service-class basis). As previously noted, the problem with dropping packets is that a packet that has already traveled several hops towards the destination must be retransmitted again from the source, so that amount of bandwidth has been wasted. Also, the end-to-end delay for the source to discover the packet has been dropped can be long, because information about whether a packet has been received needs to be communicated from the destination. As a result, a source will typically employ a timeout prior to resending a packet if no ACK has been received prior to the timeout expiring.

The problem with doing backpressure the way it is traditionally done (e.g., Infiniband or Data Center Bridging) is that congestion can spread; a single slow resource (e.g., a destination) can have its packets occupy all the buffers in a switch, and since the switch is not allowed to drop those, the switch must refuse to receive any more packets (for that class), even though those new packets may not be travelling towards the congested resource. This in turn can cause buffers to become full in adjacent switches, etc.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2a is a network diagram illustrating a view of the network diagram of FIG. 2 depicting only the stepping stone switches, along with tunneled virtual links connected between pairs of stepping stone switches;

FIG. 2b is a network diagram illustrating a view of network architecture including two hierarchical levels that shows the network diagram of FIG. 2a overlaid over the network diagram of FIG. 2;

FIG. 7b shows packet flows and associated source and destination buffers corresponding to the stepping stone switches in FIG. 7a;

FIG. 7c depicts a tunneled sub-path between the stepping stone switches of FIG. 7a;

DETAILED DESCRIPTION

Figure 1:
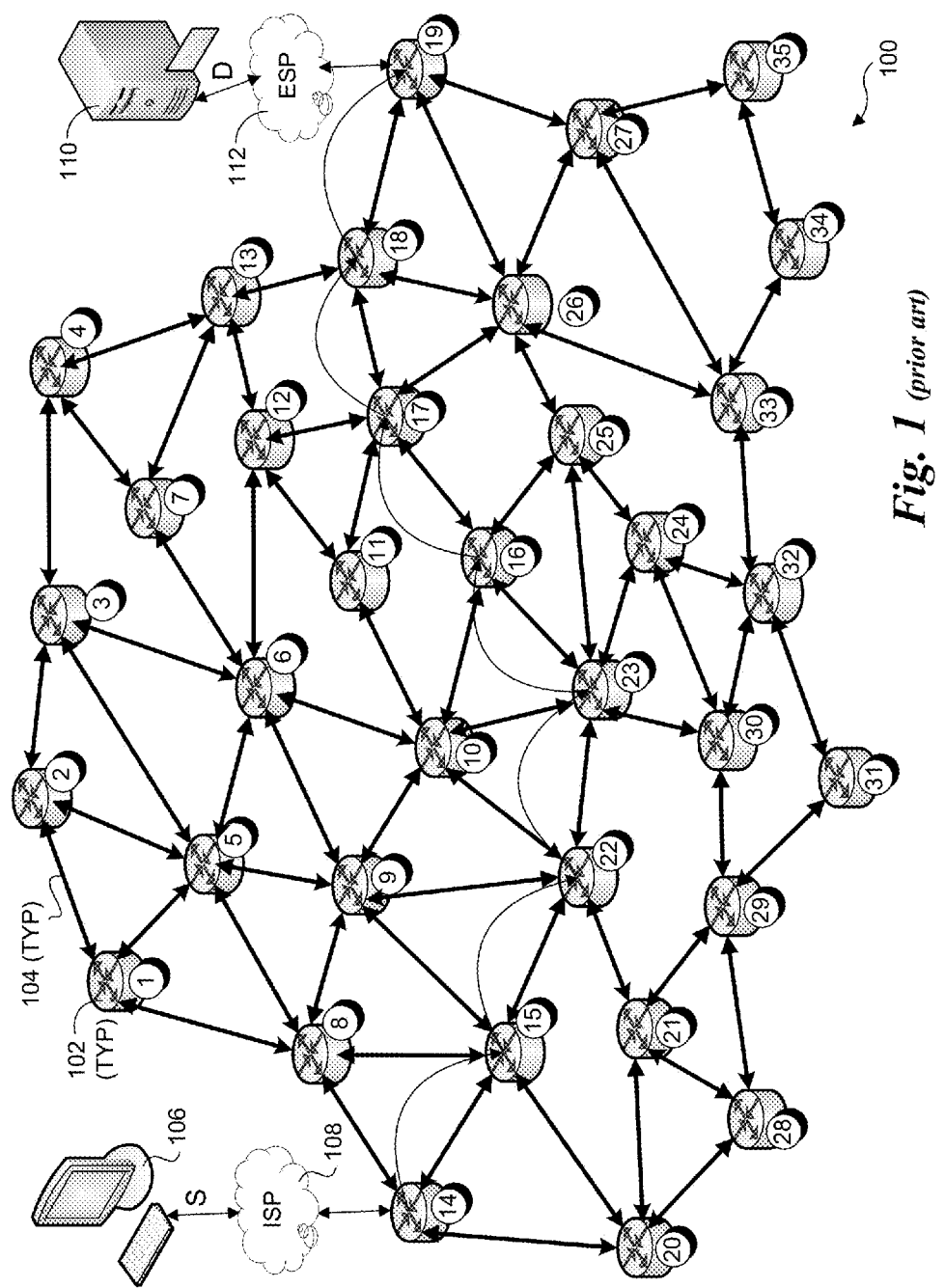
FIG. 1 is a network diagram illustrating a conventional computer network in which multiple switches are interconnected via various links.

Embodiments of methods and apparatus for enhancing network performance using Hop-by-Hop forwarding with error recovery are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspect of the embodiments disclosed herein, enhanced network performance is facilitated via the use of "stepping stone" switches interspersed with conventional network switches. The stepping stone switches are configured to forward packets as flows between stepping stone switches in a Hop-by-Hop manner, as opposed to conventional forwarding under which packets are routed from a source to a destination using an arbitrary path or along a (generally) lengthy flow-based path. (As used herein in this detailed description, a "hop" without capitalization corresponds to a conventional network usage of the term, while a "Hop" with capitalization corresponds to a logical Hop between stepping stone switches.) Accordingly, packets from a source endpoint are routed to a destination endpoint via multiple stepping stone switches, with flows between pairs of stepping stones typically traversing one or more conventional switches and comprising a Hop.

The general concept is to have some switches (i.e., the stepping stones) that are configured with sufficient resources for some number of flows, so that they can hold packets, and retransmit them if necessary, until they are acknowledged by the next stepping stone. Not all flows need to utilize the stepping stone service, and those that do not use the stepping stone service can be handled according to traditional networking; either though best effort (e.g., being dropped if necessary, and if reliability is required, being retransmitted from the source or hop by hop) or by being backpressured along with other flows in the same class.

In some embodiments, the configuration of a stepping stone switch is similar to a conventional switch except that a stepping stone switch has substantially more buffer resources (as well as additional logic for creating and multiplexing packet flows, creating sub-path Hops, and augmenting forwarding tables, as detailed below). Since flows between stepping stones are employed such that packets for a given flow between a pair of stepping stone switches are routed via sub-paths including one or more intermediate conventional switches, the intermediate switches may be implemented with less buffer resources. For example, in some embodiments most or all of the traffic that is routed via a given intermediate switch appears (from the switch's standpoint) to be between two stepping stones (i.e., the stepping stones appear to be the source and destination endpoints). Accordingly, the number of buffers that have to be maintained by the one or more conventional switches along a flow route is reduced (when compared to conventional network architectures), reducing the occurrence of dropped packets and the need to employ backpressure at the intermediate switches.

Figure 2:
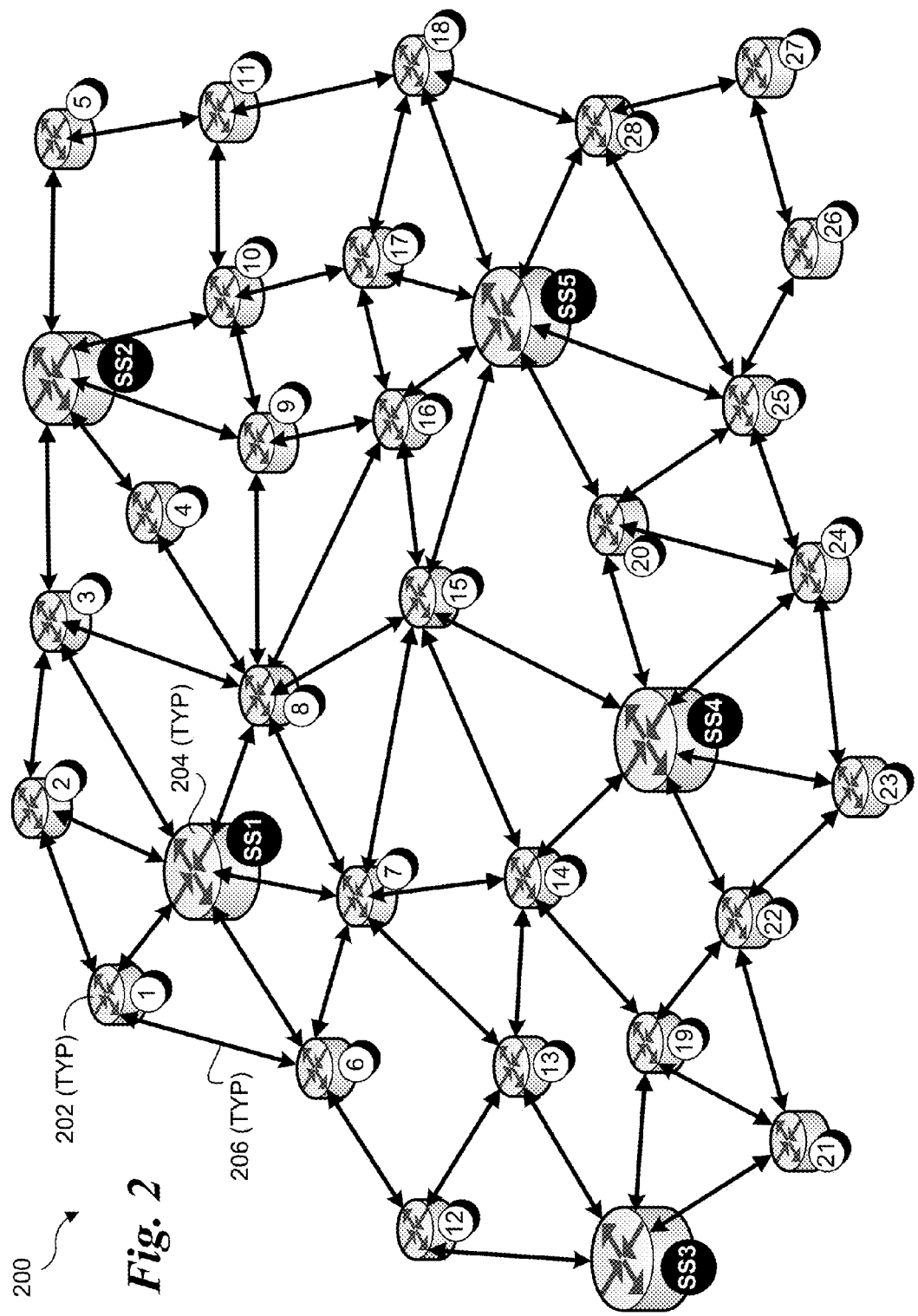
FIG. 2 is a network diagram illustrating a computer network employing a plurality of stepping stone switches interspersed with conventional network switch elements.

FIG. 2 shows a network 200 illustrating an exemplary network architecture employing a mixture of network switches 202 (labeled 1-28) and stepping stone switches 204 (labeled 1-5, white numbers on black) linked in communication via a plurality of links 206. Generally, each of the switches 202 may comprise a conventional network element such as a switch or router configured to perform conventional routing/forwarding operations similar to those performed by switches 102 in FIG. 1. In addition to supporting conventional routing/forwarding operations, each of stepping stone switches 204 is configured to support additional routing/forwarding operations and include additional buffer resources (relative to switches 202).

According to one aspect, network 200 comprises a network with two hierarchical levels, one occupied by both switches 202 and stepping stone switches 204, and the other occupied only by stepping stone switches 204. For example, FIG. 2a illustrates an upper hierarchy level occupied by stepping stone switches 204, which are connected to one another via tunneled virtual links 208. Meanwhile, FIG. 2b shows the hierarchical level comprising the stepping stone switches 204 and tunneled virtual links 208 of FIG. 2a overlaid over the network 200 configuration shown in FIG. 2, noting that a stepping stone switch may function as both a conventional switch and a stepping stone switch, and thus stepping stone switches occupy both hierarchical levels.

Figure 3:
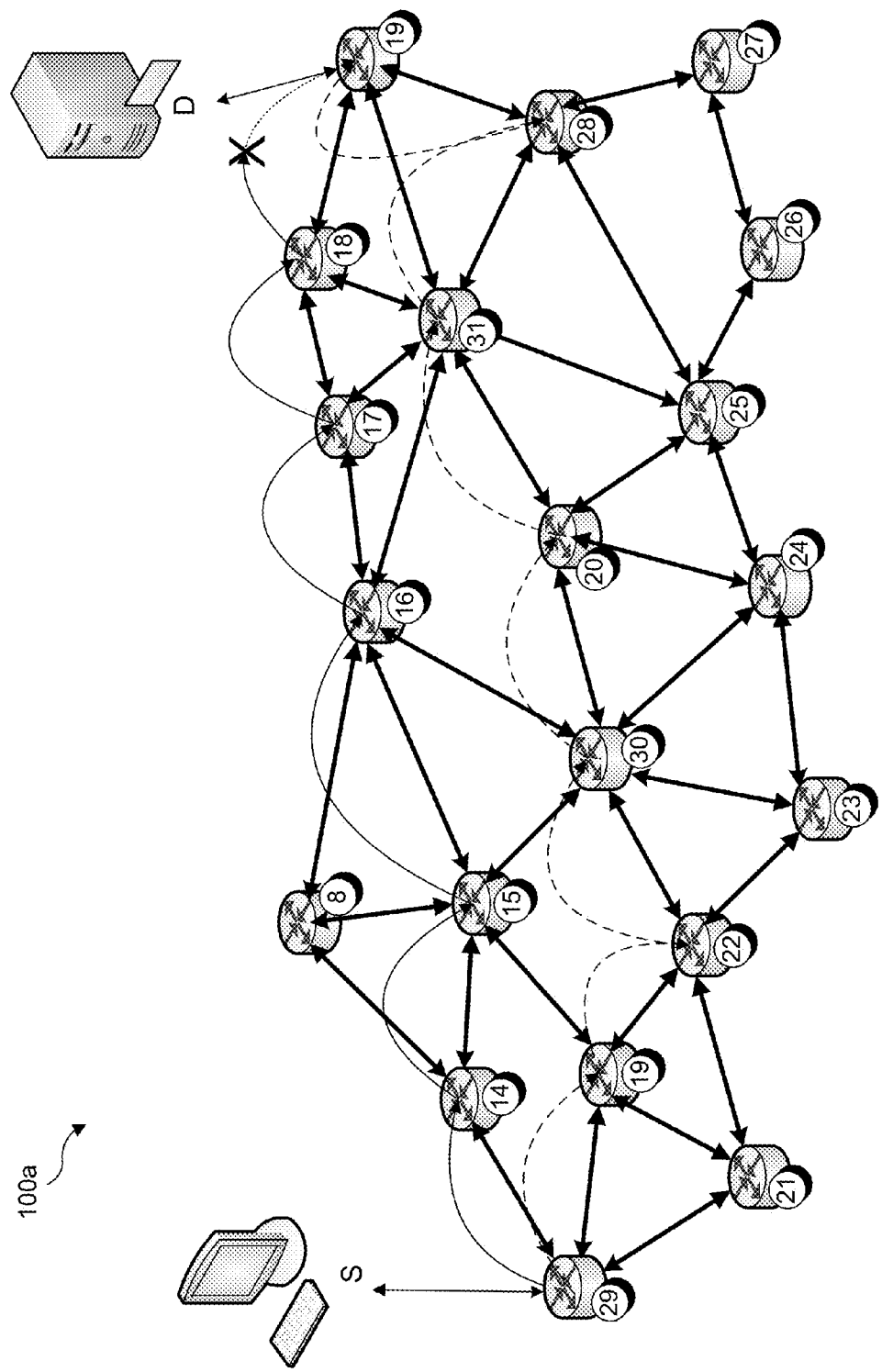
FIG. 3 show a pair of routing paths in a conventional computer network between source and destination computers.
Figure 4:
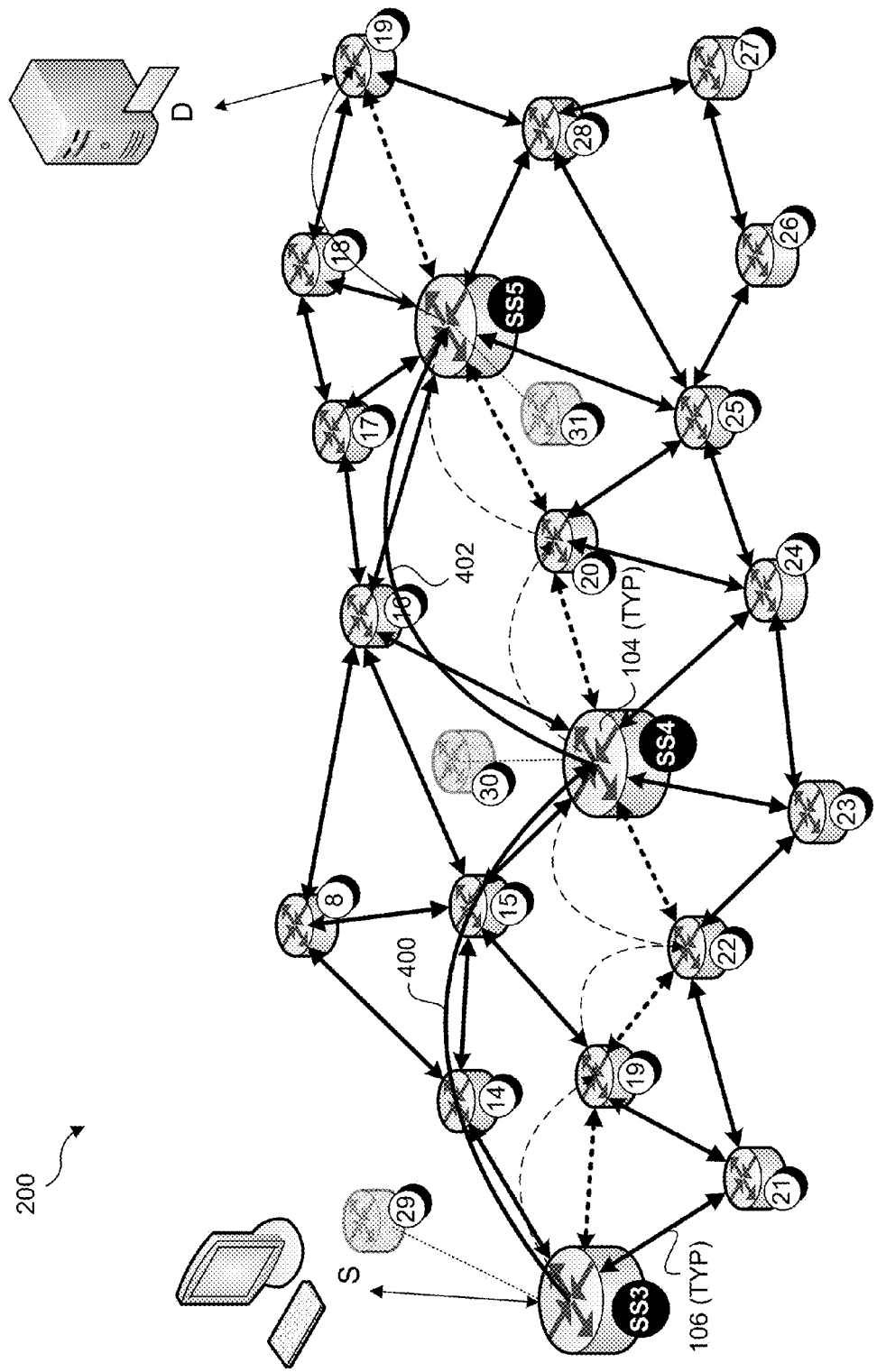
FIG. 4 shows a Hop-by-Hop routing path between source and destination computers employing stepping stone switches.

A comparison for routing packets from a source endpoint to a destination endpoint using a conventional network and a network employing a stepping stone switch approach is shown in FIGS. 3 and 4, respectively. The illustrated network portions of network 110a of FIG. 3 and network 200 of FIG. 4 having similar switch and link configurations (sans the stepping stone aspects); under network 200, the conventional switches 29, 30, and 31 of FIG. 3 are replaced by stepping stones SS3, SS4, and SS5, respectively. For each network, packets are sent from a source computer S to a destination computer D. (For simplicity, any network infrastructure between source computer S and switch 29 and between switch 19 and destination computer D is not shown.)

Assuming network 110a is an IP network and TCP (Transmission Control Protocol) confirmed packet delivery is implemented, under the conventional approach illustrated in FIG. 3 a first packet is sent using the TCP/IP protocol along a path including switches 29, 14, 15, 16, 17, 18 and 19. As illustrated, the hop between switches 18 and 19 has an X, indicating the packet has been dropped or lost. Under TCP/IP, successful transmission of each packet is acknowledged by returning an ACKnowledgement message (i.e., ACK packet) from the destination to the source. If an ACK message for a given packet is not received within a predefined timeout period, the source computer's network interface and/or network software assumes the packet has been dropped, and retransmits the packet. The retransmitted packet might travel along the same path as the packet that was lost, or it might travel over a different path. FIG. 3 illustrates an example of using a different path, wherein a copy of the dropped packet is resent along a second path (shown in dashed lines) including switches 19, 22, 30, 20, 31, 28, and 19, whereupon it is forwarded to destination computer D.

By comparison, the routing for packets between source computer S and destination computer D under network architecture 200 employ the stepping stone approach. In further detail, the routing path between source computer S and destination computer D includes two sub-paths 400 and 402 between stepping stones SS3 and SS4, and between stepping stones SS4 and SS5, respectively. Sub-path 400 comprises a routing path from stepping stone SS3 to switch 19, then to switch 22, and to stepping stone SS4. Sub-path 402 comprises a routing path from stepping stone SS4 to switch 20, then to stepping stone SS5. Each of sub-paths 400 and 402 also comprise a virtual tunnel between stepping stone endpoints. Once a packet reaches stepping stone SS5, it is forwarding along a next hop to switch 19, which then forwards the packet to destination computer D.

Figure 5A:
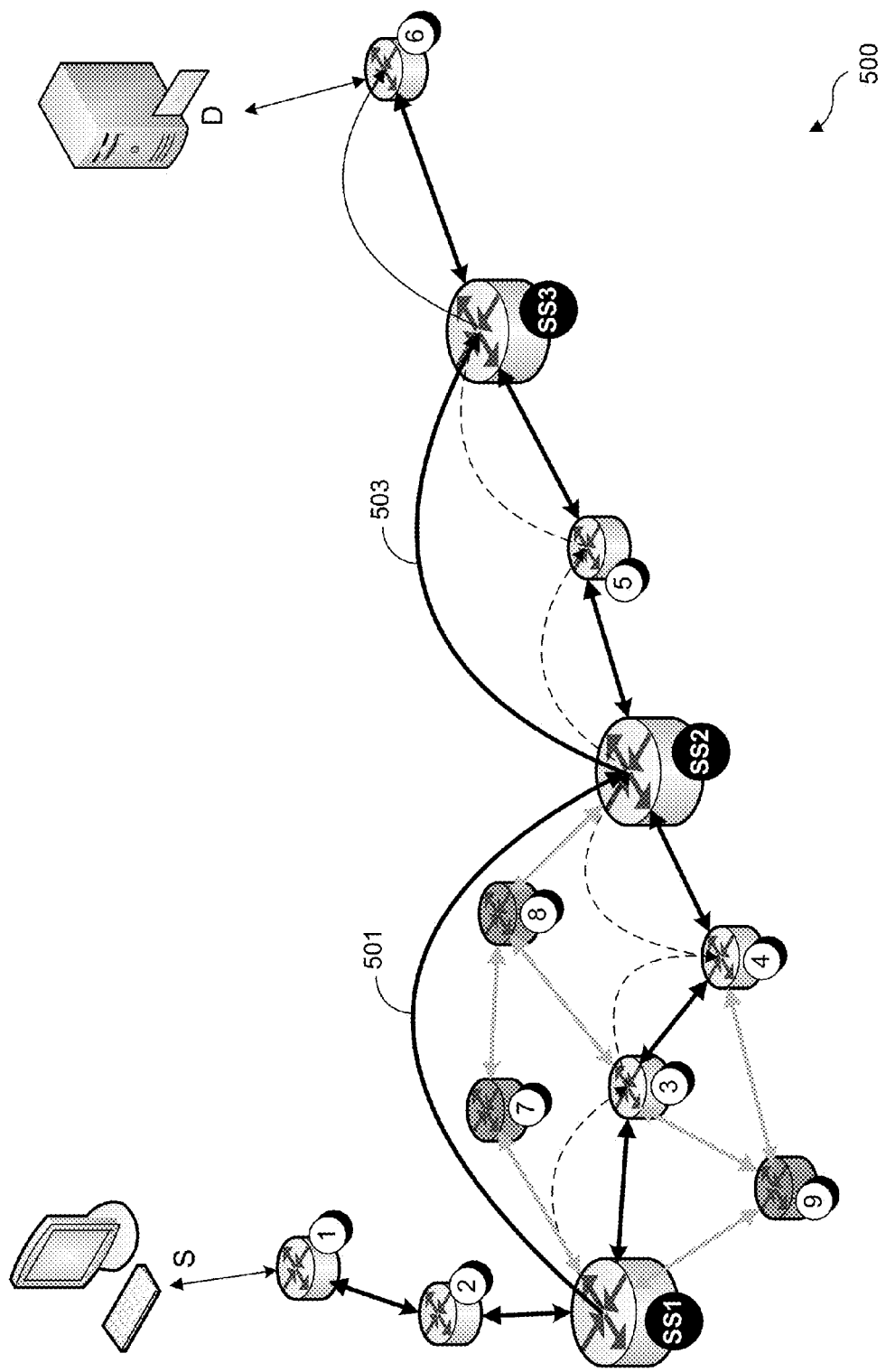
FIG. 5a shows a routing path between a source and destination computer that includes two tunneled sub-paths between pairs of stepping stone switches.
Figure 5B:
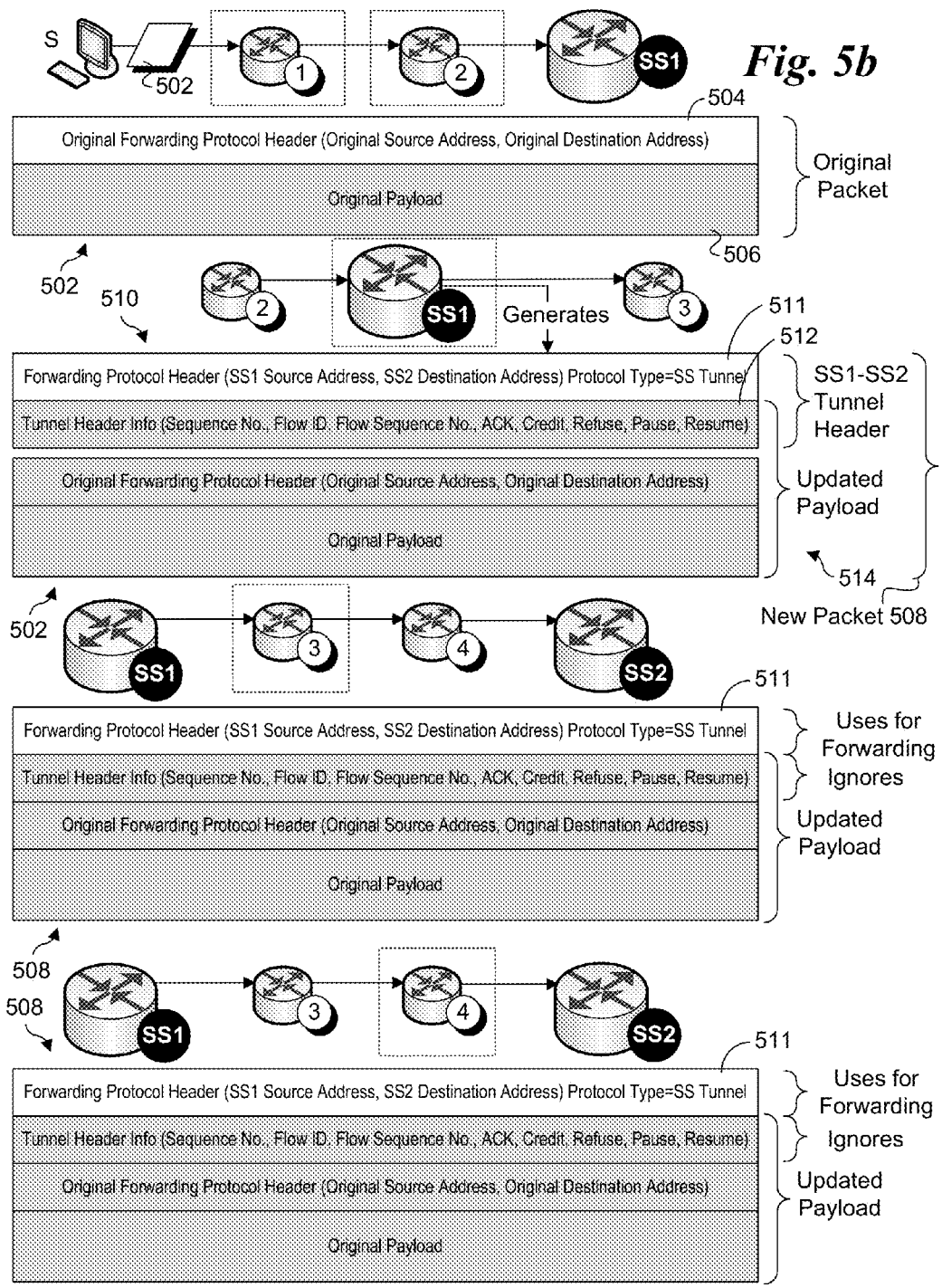
FIGS. 5b-5d illustrate the packet format and header configuration as the packet is forwarded via the switches in the routing path of FIG. 5a FIG. 6 is a flowchart illustrating operations and logic performed by the stepping stones switches and conventional switches in forwarding packets via a Hop-by-Hop technique, according to one embodiment.
Figure 5C:
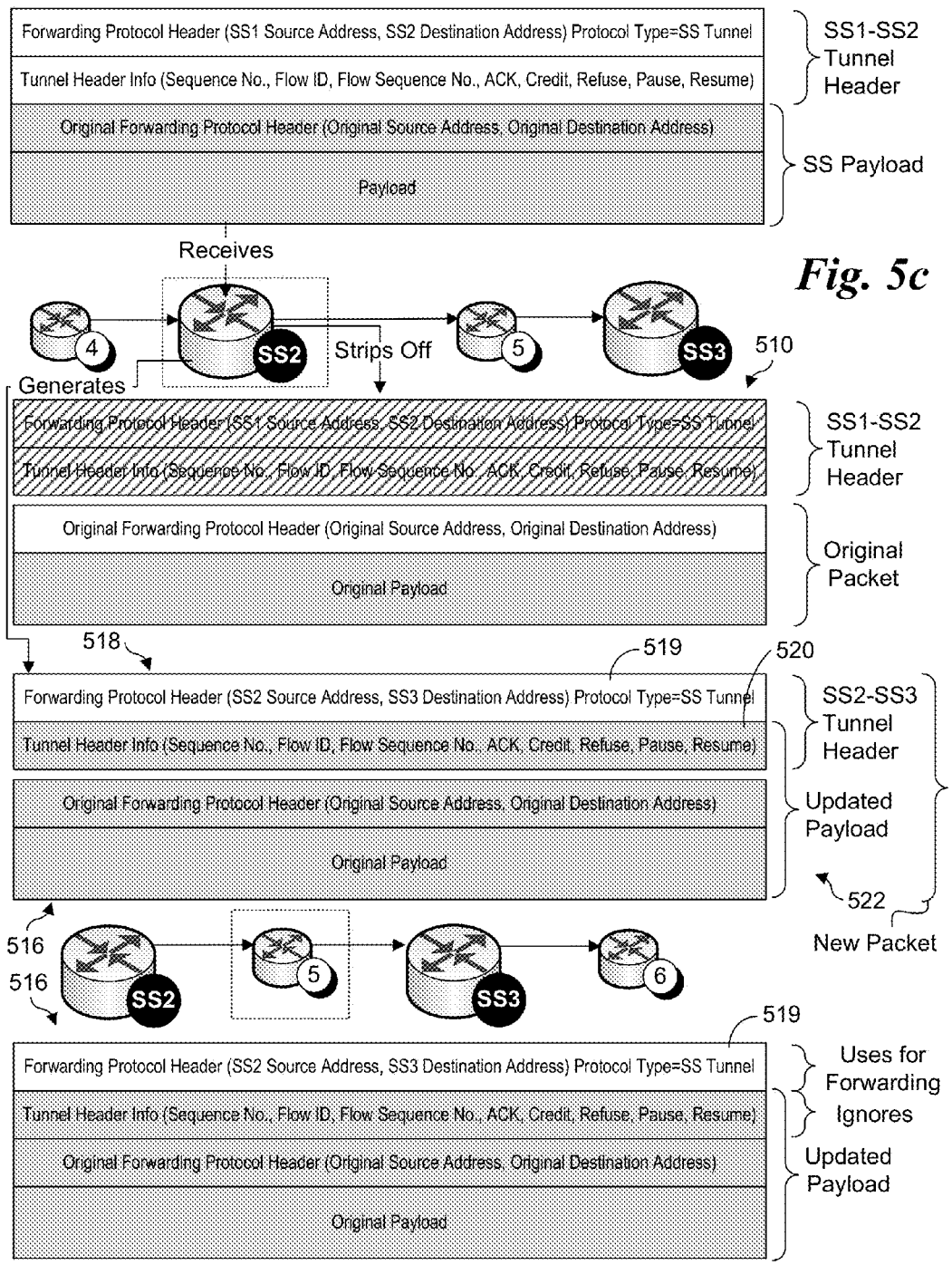
Figure 6:
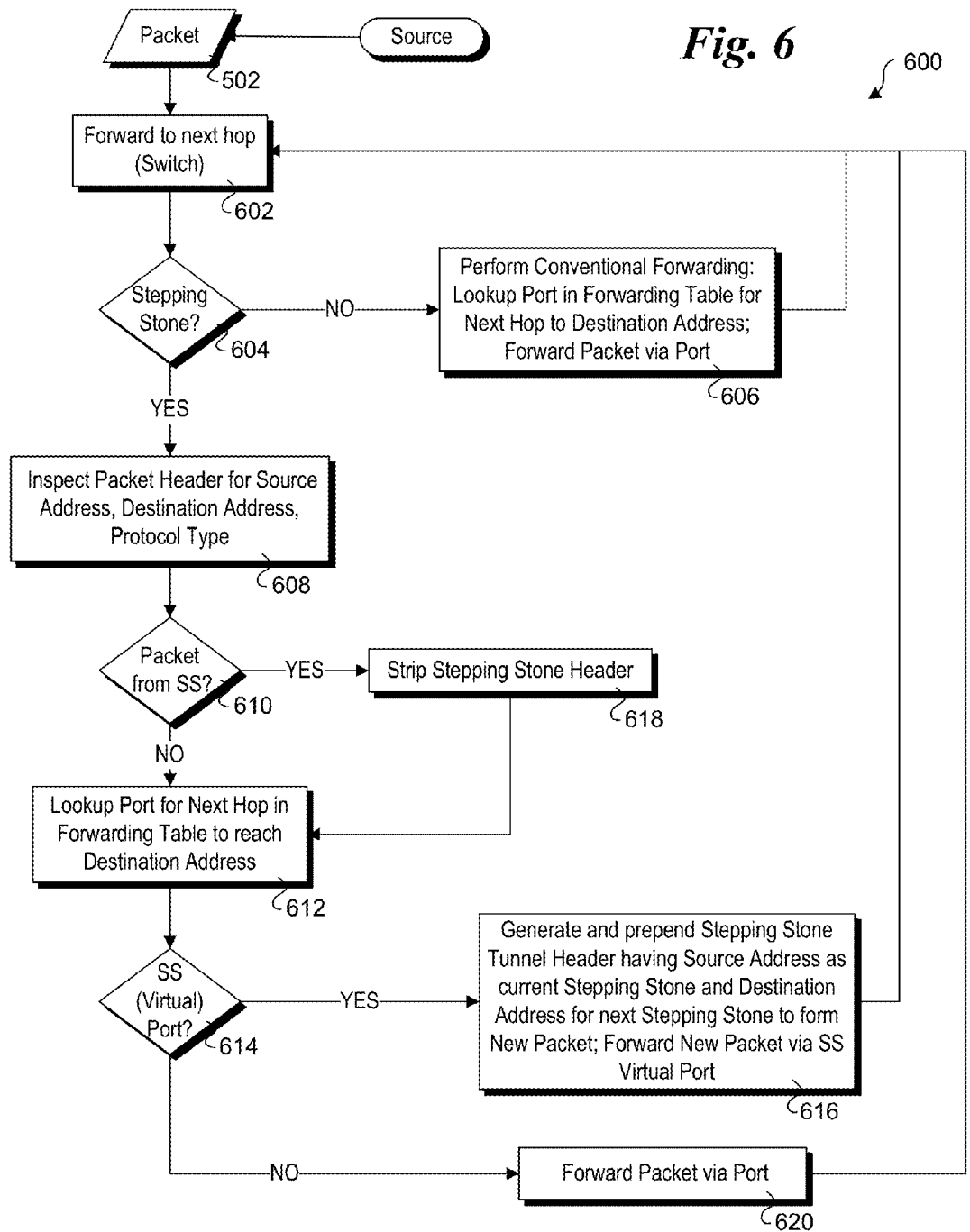

An example detailing various aspects of the stepping stone service is depicted in FIGS. 5a, 5b, and 5c, with corresponding operations and logic implemented by the network switches illustrated in a flowchart 600 of FIG. 6. As shown in FIG. 5a, the routing path 500 between source computer S and destination computer D comprises links coupled between source computer S and switch 1, switch 2, stepping stone SS1, switch 3, switch 4, stepping stone SS2, switch 5, stepping stone SS3, switch 6, and destination computer D.

With reference to FIG. 5B and flowchart 600, the transmission process begins with a packet 502 being transmitted from source computer S to switch 1. As depicted in a block 602, the packet is forwarded from a prior hop or starting point (in this case a source computer S, which operates as the source endpoint) to a next hop (switch 1). As shown in the packet detail, the original configuration of packet 502 comprises an original network forwarding protocol header 504 including an original source address (i.e., address for source computer S) and original destination address (i.e., address for destination computer D), followed by a packet payload 506. It will be understood that the packet formats illustrated in this example are generalized to apply to multiple types of network protocols, and that the configuration of actual packets would follow the formatting used for any applicable protocol(s) employed by a given network. For example and without limitation, the original protocol header may comprise an IP header, an Ethernet header, an Infiniband header, etc. In addition, although only a single header is shown, original network protocol header 504 may comprise multiple protocol headers (e.g., a TCP header and an IP header). Moreover, lower-level headers, such as MAC (Media Access Channel) headers are not shown, noting that one having skill in the networking arts would understand the usage of such headers.

In a decision block 604 a determination is made to whether the current switch (switch 1) is a stepping stone switch switch. (In accordance with this example, a switch in this network may be either a conventional (i.e., non-stepping stone) switch or a stepping stone switch.) Since switch 1 is a conventional switch, the answer to decision block 604 is NO, and the flowchart proceeds to a block 606 in which conventional forwarding operations are performed. As is well-known, this includes performing a lookup in the switch's forwarding table using an applicable lookup value (such as a packet classification result, e.g., using a destination address filter or a 5-tuple hash on an IP header) to identify the port to use to forward the packet to the next hop along a route that will reach the endpoint identified by the destination address. In addition, if switch 1 is an edge switch, it may further be configured to classify packet 502 (classification operations not shown) such that it is classified to a traffic class employing stepping stone services. In some embodiments, the forwarding tables of edge switches include forwarding rules and/or filters that favor routes employing stepping stone services. In other embodiments, an edge switch may be agnostic to the existence of stepping stone services.

In further detail, in the illustrated embodiment the network is a managed network that is configured to facilitate use of managed flows using stepping stones switches for applicable traffic classes. In this example it is presumed that packet 502 belongs to a managed traffic class, and the forwarding table lookup performed by switch 1 identifies that the preferred stepping stone route may be reached via switch 2. Accordingly, packet 602 is forwarded out of a port in switch 1 that is coupled via a link to switch 2, with the flowchart logic returning to block 602, resulting in packet 502 being forwarded to switch 2. Depending on the applicable protocol, switch 1 may or may not make some changes to original packet header 504 (such as decrementing a Time-to-live (TTL) countdown for an IP packet); however, the original source and destination addresses will remain the same.

Continuing with packet 502 arriving at switch 2, the flowchart logic again flows through decision block 604 and block 606, resulting in packet 502 being forwarded from switch 2 to stepping stone switch SS1 and the original source and destination addresses for the packet remaining unchanged, as depicted toward the top of FIG. 5b. As before, the forwarding table for switch 2 is configured to forward packets corresponding to certain classifications, including the traffic class for packet 502, via stepping stones. As a result, an applicable port coupled to the link between switch 2 and switching stone SS1 is selected by switch 2 in block 606 to forward the packet.

At this point, packet 502 is received at stepping stone switch SS1, and the flowchart logic has returned to decision block 604. This time, the answer to the decision block is YES, and the logic proceeds to a block 608 in which the packet header is inspected to determine if the packet has been forwarded from a stepping stone, with the result shown in decision block 610. In one embodiment, a determination that a packet has been forwarded via a stepping stone involves the following logic. First, a determination is made to whether the destination address for the packet corresponds to the address for the stepping stone. If this is YES, the protocol type field (for forwarding protocols supporting a prototype field) is inspected to determine if the protocol type is a stepping stone tunnel. If so, the packet has been forwarded by a stepping stone, and the source address is inspected to identify the virtual port via which the packet has been received. One of skill in the art will recognize that all packets will be received and sent out over physical ports, some or all of which may be associated with virtual ports depending on whether they are used for sending or receiving packets using a stepping stone sub-path.

Returning to decision block 610 and the depiction of the packet format at stepping stone SS1 in FIG. 5b, the answer to decision block 610 is NO, and the logic proceeds to a block 612 in which a lookup in the stepping stone SS2's forwarding table is made to determine the next hop for forwarding the packet to the next hop along the forwarding path based on the current destination address. In the example illustrated in FIG. 5a, the packet is to be forwarded along a stepping stone sub-path 501 between stepping stones SS1 and SS2. As discussed above, stepping stone ports are virtual ports that are associated with physical ports on the stepping stone switches. As depicted by a decision block 614, if the packet is to be forwarded via a stepping stone sub-path to another stepping stone, the forwarding table lookup will identify the packet is to be forwarded via a stepping stone virtual port, resulting in a YES decision and the logic proceeding to a block 616.

Forwarding via a stepping stone sub-path employs a reliable protocol via the use of a stepping stone tunnel header, which in one embodiment is generated and formatted as follows. As shown in block 616 and depicted by a packet 508 in FIG. 5B, stepping stone switch SS1 prepends a stepping stone tunnel header 510 including a forwarding protocol header 511 and tunnel header information 512. Forwarding protocol header 511 comprises a header corresponding to the forwarding protocol being used to forward the packet in the network. In the current example, this is an IP header; however, this is not to be limiting. The forwarding protocol header includes source and destination addresses corresponding to the current stepping stone and the next stepping stone, as depicted by stepping stone SS1 source address and stepping stone SS2 destination address. In some embodiments, the forwarding protocol header also includes a protocol type field identifying the protocol type is a stepping stone (SS) tunnel.

Tunnel header information 512 includes a plurality of fields with optional values (i.e., field values may be null). In one embodiment, each forwarded packet contains a tunnel flow sequence number, along with one or more optional stepping stone tunnel header fields. Additional details concerning usage of the tunnel flow sequence number and other fields is provided below. In one embodiment, forwarding protocol header 511 comprises a prepended header and tunnel header information 512 comprise a portion of the new packet 508's payload, as depicted by updated payload 514. As shown, the updated packet payload 514 is generated by prepending tunnel header information 512 to the data content of original packet 502.

Returning to block 616, after the stepping stone tunnel header is generated and prepended to form new packet 508, the current stepping stone switch (e.g., SS1) performs a forwarding table lookup to determine what virtual port to employ to forward the new packet so it will reach the new packet destination address, which corresponds to the address of the next stepping stone (e.g., SS2).

In one embodiment, the next hop may be selected in accordance with a tunneled flow assigned to the packet. As shown in FIG. 5a, there are multiple possible sub-path routes between stepping stones SS1 and SS2. For example, in addition to the selected route of SS1→3→4→SS2, other possible routes include SS1→7→8→SS2, SS1→3→8→SS2, and SS1→9→4→SS2. Moreover, it is possible to implement longer routes, such as SS1→9→3→4→SS2, SS1→3→9→4→SS2, etc.

As discussed in further detail below, in some embodiments, flows corresponding to most or all of the packets between a given pair of stepping stone switches may be multiplexed via a single path. Optionally, flows corresponding to different classes of service may be multiplexed over different paths. As yet another option, flow paths may be created or dynamically reconfigured based on real-time traffic conditions.

In some instances, a packet may arrive at a first stepping stone switch without prior classification. In one embodiment, an unclassified packet is classified by the first stepping stone based on one or more header field values. For example, a packet may be classified to be forwarded using an associated class of service level, or as part of a flow associated with the classification. Such classification may typically apply to forwarding operations across all switches in a route path, or only the stepping stone switches. In addition, a second level of packet classification may also be implemented between pairs of stepping stone switches, as described in further detail below. For instance, packets may be classified to (sub-) flows between pairs of stepping stone switches.

After the virtual (output) port is determined, the packet it then forwarded via the physical output port associated with the identified virtual port to the next hop (switch 3) in accordance with block 602. Continuing at decision block 604 and the packet 508 configuration shown for switch 3 in FIG. 5b, the result of decision block 604 is NO, since switch 3 is not a stepping stone switch. As before, the packet is then forwarded in the conventional manner in block 606. From the perspective of switch 3 (and other non-stepping stone switches), packet 508 appears as a conventional packet with a normal forwarding protocol header (e.g., a normal IP header in this example), with a source address and destination address along with various other fields (that are not shown for clarity). The remaining data in packet 508 appears (from a conventional switch perspective) as the packet payload, and thus tunnel header information 512 is simply ignored. In the present example, the next hop is switch 4, which processes packet 508 in a similar manner to switch 3, resulting in packet 508 being forwarded to stepping stone SS2, which is the destination endpoint for stepping stone sub-path 501.

Returning to decision block 604 and advancing the packet configuration to the top of FIG. 5c, the current progress of the packet forwarding sequence now corresponds with stepping stone SS2 receiving packet 518 from switch 4. This results in a YES answer to decision block 604, and a YES answer for decision block 610, since forwarding protocol header 511 identifies stepping stone SS2 as the destination address and the protocol type is stepping stone tunnel. As a result, the flowchart logic proceeds to a block 618 in which the stepping stone header (i.e., stepping stone header 510) is stripped off the packet. The logic then proceeds to block 612 where the forwarding port for the next hop is determined. In a manner similar to when the packet arrived at stepping stone SS1, the next portion of the forwarding path for the packet is via a stepping stone sub-path 503, as shown in FIG. 5a. This sub-path has source and destination endpoints corresponding to stepping stones SS2 and SS3, respectively.

As before, a new packet 516 is formed by prepending a stepping stone header 518 including a forwarding protocol header 519 having source and destination addresses corresponding to stepping stone switches SS2 and SS3, as well as tunnel header information 520, and the virtual port for the next hop (in this instance switch 5) is identified in block 616. Packet 516 is then forwarded to switch 5, which inspects forwarding protocol header 519 and recognizes it as a conventional IP header, resulting in the packet being forwarded to stepping stone SS3, which corresponds to the destination address for packet 516.

Figure 5D:
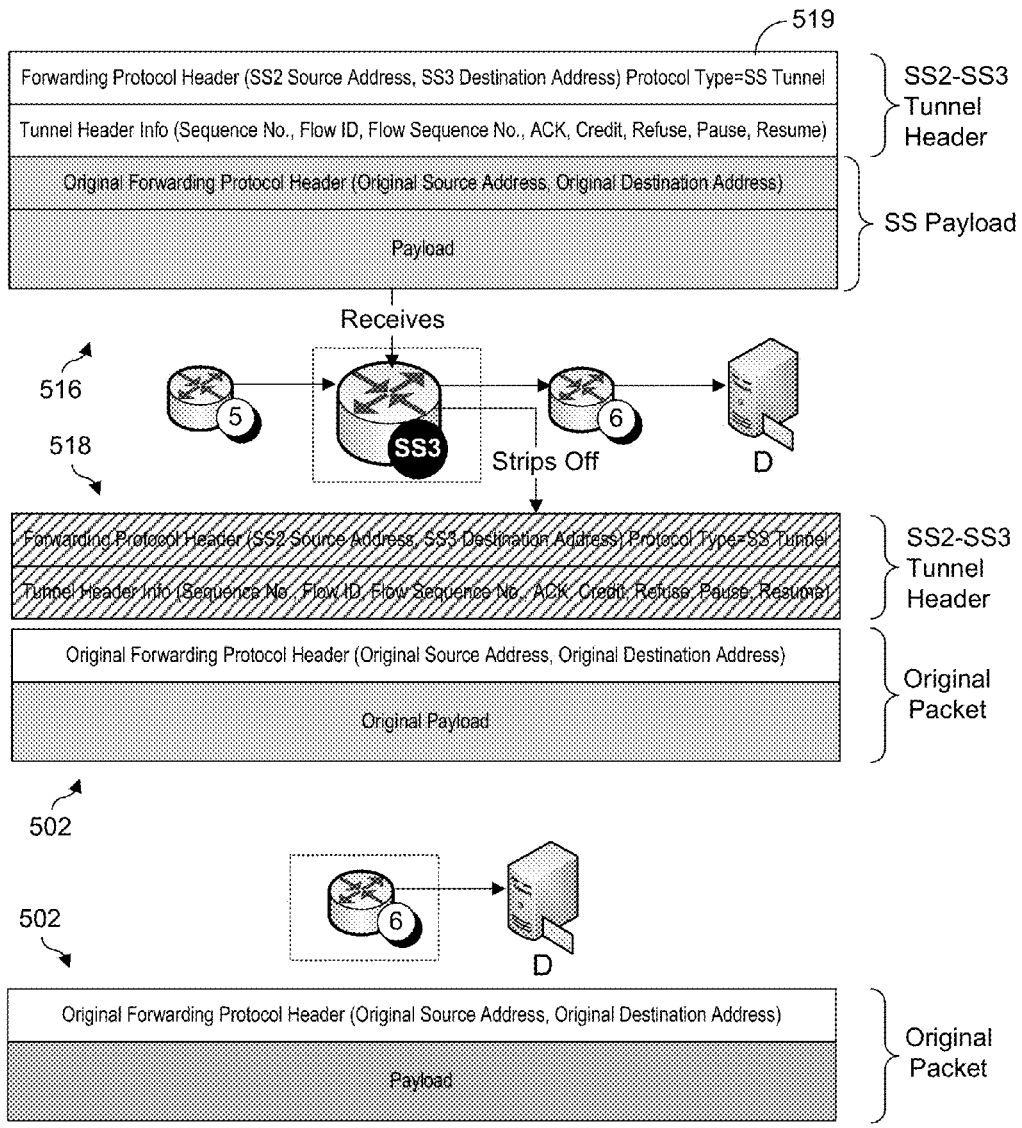

Continuing at the top of FIG. 5d and decision block 604, at this stage packet 516 is received by stepping stone SS3. As before, stepping stone SS3 examines forwarding protocol header 519 and identifies packet 516 being received via a virtual port from a prior stepping stone. As a result, the flowchart logic proceeds to block 618, which strips off stepping stone tunnel header 518, leaving original packet 502. The logic then proceeds to block 612 to perform a lookup in stepping stones SS3's forwarding table for the next hop based on the original destination address for the packet (or otherwise based on packet classification that considers the destination address). This time, the next hop does not involve a portion of a stepping stone sub-path, and so switching stone SS3 simply forward original packet 502 in the conventional manner via the identified physical port to reach switch 6, as depicted by the operation in a block 620.

At this point, the original packet 502 reaches switch 6, which then forwards the packet in the conventional manner to destination computer D, completing the forwarding sequence. From the viewpoint of destination computer D, original packet 502 has simply been forwarded in a conventional manner and computer D's networking logic is not aware or even considers that the actual routing path included one or more stepping stone sub-paths.

Flow Management, Multiplexing, and Tunneling

Figure 7A:
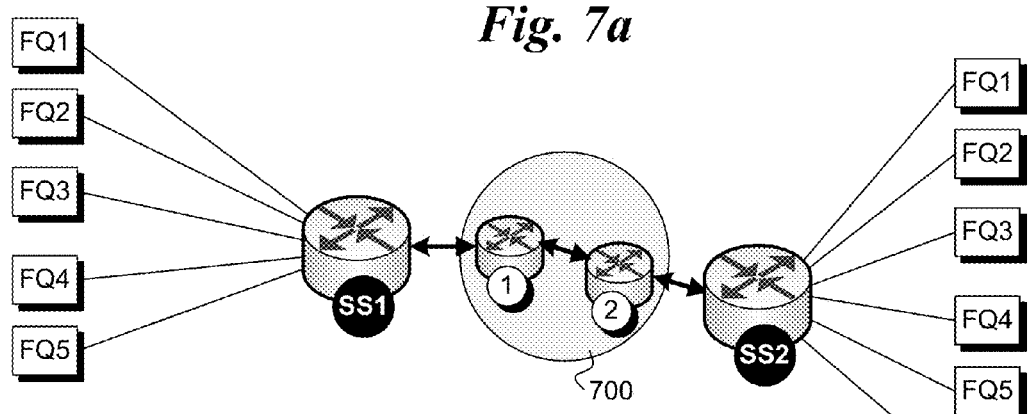
FIG. 7a is a diagram illustrating multiplexing of packet flows over a tunneled sub-path between a pair of stepping stone switches.
Figure 7B:
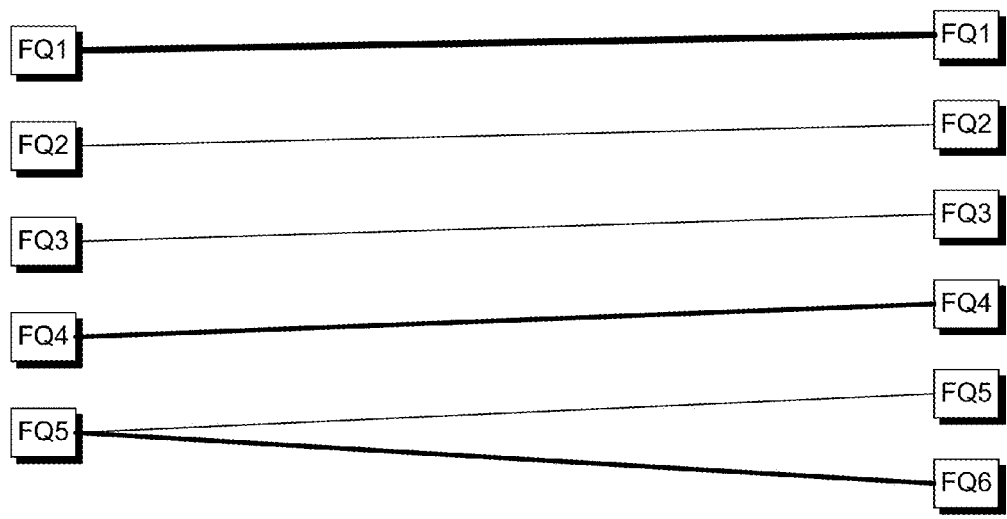
Figure 7C:
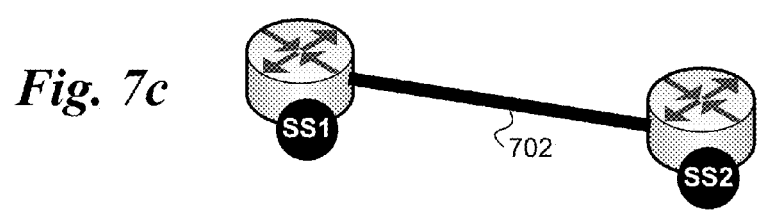

Accordingly to additional aspects of some embodiments, resources on the stepping stone switches are provided to facilitate flow management and traffic multiplexing over tunneled sub-paths between stepping stone switch pairs. An exemplary configuration illustrating aspects of flow management, multiplexing, and tunneling implemented for a stepping stone sub-path is shown in FIGS. 7a-7c. FIG. 7a depicts a sub-path between stepping stones SS1 and SS2 that traverses one or more intermediate switches 700, as depicted by switches 1 and 2. Stepping stone SS1 includes five flow queue buffers FQ1-FQ5, and stepping stone SS2 includes six flow queue buffers FQ1-FQ6. As shown in FIG. 7b, there are a number of managed flows between stepping stones SS1 and SS2, with corresponding packets being buffers in the depicted flow queue buffers, and wherein a width of the line segment is used to represent the relative portion of bandwidth consumed by that flow. Each of the managed flows is identified by the buffers at the end of the lines, e.g., flow FQ1-FQ1, FQ1-FQ2, FQ3-FQ3, etc. It is further noted that there need not be a 1:1 correlation between flow queues on a sending stepping stone and flow queues on a receiving stepping stone.

As shown in FIG. 7c, the various flows between stepping stones SS1 and SS2 are tunneled through intermediate switches 1 and 2 as a single flow. Optionally, the flows could be transferred using multiple tunnels, each tunneling a set of the flows. Yet as another option, selected flows could be tunneled between a pair of stepping stones using a route that traverses other intermediate switches (not shown).

In one embodiment, flows that utilize stepping stones operate in the following manner. A packet is tunneled from one stepping stone to another, using a header that contains information such as, a "current stepping stone SS1", "next stepping stone SS2", and a sequence number (of the stream between those two stepping stones SS1-SS2), as described above. Optionally, the header may include a Flow Id and an associated sequence number for that flow. In some embodiments, each stepping stone keeps some number of buffers for flows, potentially with the granularity of having a buffer pool for each flow (S(ource-D(estination)) that is using that stepping stone's service. For simplicity we'll describe it as having a separate pool for each (S,D) pair, but potentially several flows could be lumped together into one pool, with the downside being that if all the buffers are full for that pool, then no more packets for that flow can be accepted by that stepping stone. In some embodiments, if a stepping stone does not have resources for a new flow, (or a new class of flows), it relinquishes the stepping stone service for some flow (either the new flow, or based on priority or some other criterion, an existing flow).

Stepping stone SS2 keeps a buffer pool for each flow class using the stepping stone service from SS1 to SS2. The intermediate switches between 1 and 2 are not aware of all the flows being multiplexed between SS1 and SS2. Intermediate switches can use either of the traditional techniques; they can drop packets (in which case the stepping stone service will still be beneficial since retransmission will be from the previous stepping stone rather than all the way from the source endpoint), or they can do backpressure of the SS1-SS2 flow, which will be beneficial compared to traditional backpressure because there will be a few enough flows that the inexpensive (non-stepping-stone) intermediate switches can reserve a buffer pool for the stepping stone flows.

With this technique a slow flow being multiplexed over the SS1-SS2 stepping stone link does not impede progress of other flows sharing the SS1-SS2 link. Because stepping stones SS1 and SS2 have enough buffer resources to keep buffers for a large number of flow classes (using their service), they can employ individual flow management techniques for each of those flow classes. For example, in one embodiment a credit-based flow control scheme is implemented, where a source stepping stone switch (e.g., SS1) does not send a packet for that flow class to a destination stepping stone (e.g., SS2) unless SS1 knows that a buffer exists at SS2 for that flow class. In one embodiment, a credit-flow scheme may be implemented with a sending stepping stone switch forwarding packets corresponding to a given flow optimistically to a receiving stepping stone switch, which buffers the packets in a corresponding flow queue. If the flow queue starts to get full, the receiving stepping stone switch can send a packet having a stepping stone header allocating a flow credit grant, which in essence says, "you (the sender) are allocated to send n more packets, but nothing further until I send you another flow credit grant." The granularity (i.e., size) of the flow credit grants may vary by implementation parameters, such as number of flows, amount of traffic (relative to forwarding throughput), dynamic nature of flows, etc. For example, a given flow credit grant could be made for n number of packets (e.g., 100 packets, 1000 packets, etc.)

Figure 8:
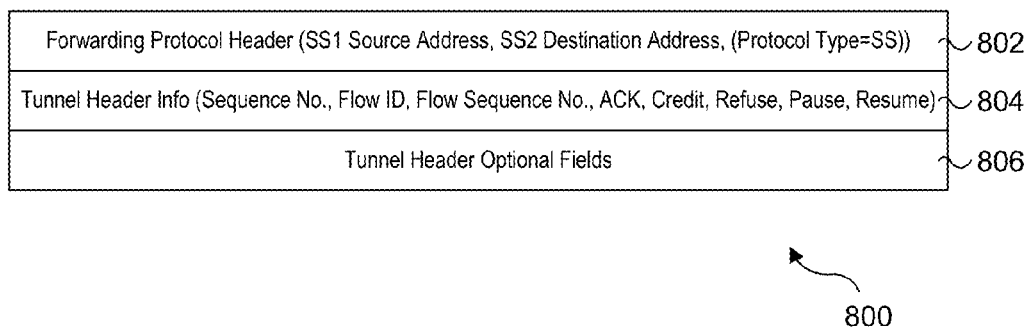
FIG. 8 illustrates a stepping stone tunnel header, according to one embodiment.

FIG. 8 illustrates an exemplary stepping stone tunnel header 800 that may be employed to support a credit-based flow control scheme and other flow control schemes described below. Stepping stone header 800 includes a forwarding protocol header 802, tunnel header information fields 804, and tunnel header optional fields 806. As discussed above, a forwarding protocol header will correspond to the type of packet header used for forwarding packets in a given type of network, such as but not limited to an IP header for networks employing IP-based forwarding. For simplicity, details of individual types of forwarding protocol headers are not provided herein, as these are well-known to those having skill in the art. The exemplary tunnel header information fields includes a tunnel flow sequence number, optional flow ID and flow sequence number, ACK field bit, Credit field bit, Refuse field bit, Pause field bit, and Resume field bit. These fields are merely exemplary, as different embodiments may employ different, additional, or fewer types of fields. Tunnel header optional fields 806 is used to depict an allocation of a portion of a tunnel header for one or more optional fields in a manner similar to that used by other network protocols. Optionally, one or more of the fields depicted for tunnel flow information fields 804 may include an expanded field or a companion field. For example, in the prior flow credit grant scenario, the number of packets for the grant could be encoded in a Credit field, wherein the existence of a non-null value indicates the packet header is associated with a flow credit grant. Optionally, a Credit bit could be used to indicate the purpose of the tunnel header, and the number of packets for the grant may be included in a companion field (not shown) or in the portion of the packet corresponding to tunnel header optional fields 806.

Figure 8A:
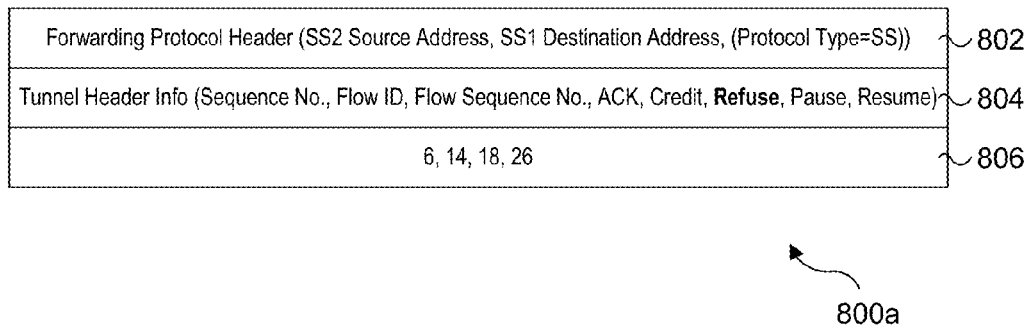
FIG. 8a illustrates a stepping stone tunnel header used for packet refusal, according to one embodiment.

As another flow control option, stepping stone SS1 sends packets for each flow class in turn, in a round robin fashion. If a particular flow class has overrun its quota at stepping stone SS2, SS2 refuses that packet, and stepping stone SS1 will retransmit it in the next round. An example of a stepping stone refusal packet header 800*a* is shown in FIG. 8*a*. In this embodiment the Refuse field bit is set to '1' (as indicated by bolding Refuse), and a tunnel header option field is used to list the sequence numbers of packets that have been refused (packets 6, 14, 18, and 26 in this example). In response the sending stepping stone is apprised of the sequence number(s) of the packet(s) that has/have been refused, and will attempt to resend those packets. In one embodiment, in response to receiving notification that a packet has been refused, the packet is resent using a new tunnel flow sequence number.

As an alternative to using a conventional round robin scheme, a weighted round robin scheme may be employed under which selected flows are allocated addition packets during each round. For example, a flow consuming a higher bandwidth and/or with larger (relative) buffer allocations may be allocated multiple packets per round, while lower bandwidth/buffer flows may be allocated a single packet. Of course, the number of packets allocated to each flow per round may be some number m, rather than a single packet at a time (or m times the weighted value).

As yet another option, a pause-resume scheme may be implemented. Under this approach, stepping stone SS1 transmits a packet for each flow in turn (e.g., round robin or weighted round robin), and if a particular flow is near its quota, SS2 sends a "pause" for that one flow, and SS1 will multiplex between other flows using the SS1-SS2 tunnel until SS2 sends a "resume" for the flow that SS2 paused. Headers conveying pause and resume could have configuration similar to stepping stone tunnel header 800, with Pause and Resume field bits set, as applicable.

An alternative approach to the credit or pause-resume approach is to employ optimistic flow management under which packets are allowed to be dropped. For example, the buffer usage for a given flow may fluctuate, resulting in packets being dropped under momentary peak loads. Under the optimistic approach, the frequency or percentage of packets being dropped is low, and thus associated bandwidth that is lost is relatively low. The optimistic approach may also save bandwidth relative to the credit or pause-resume approaches, since the usage of packets sent from the destination stepping stone back to the source stepping stone to facilitate flow management may be reduced.

The use of Hop-by-Hop stepping stone services employing flow multiplexing and tunneling provides significant performance advantages under applicable traffic conditions. For example, from the viewpoint of intermediate switches S1 and S2, most or all of the traffic that is forwarded through them could be classified as a single flow (i.e., a flow SS1-SS2) or a small number of flows (SS1-SS2 flows having different service classes). As a result, rather than partitioning available buffer resources to support a fairly large number of flows, the buffer resources may be pooled together as a single buffer or a few buffers. The benefit under this approach is that the switches may better utilize their buffer resources without having to drop packets or implement backpressure operations to reduce the fill level of their buffers.

In conjunction with the foregoing flow management, multiplexing, and tunneling approach, the stepping stones may manage their flows individually, wherein backpressure is applied to selected flows on an as-needed basis to manage the packet processing throughput of the multiplexed flow through the intermediate switches. For example, although the switches between stepping stones SS1 and SS2 might do flow control of the SS1-SS2 stream, they do not need resources for each of the multiplexed flows; it is up to SS1 to fairly share the bandwidth of the SS1-SS2 tunnel among the multiplexed flows. If one of the multiplexed flows is slow, that will not impede progress of the other multiplexed flows; that single (S, D) flow can be backpressured by stepping stone SS2 and held by stepping stone SS1.

A feature common to some network protocols is packet delivery verification. As discussed above, in a protocol such as TCP, delivery verification is facilitated via an ACK message that is sent back from the destination endpoint to the source endpoint. Also as discussed above, any bandwidth used for forwarding a packet that does not reach its destination is lost for the portion of the route the packet traversed before being dropped or lost.

Another advantage facilitated through use of stepping stones and tunneled links is improved performance relating to delivery confirmation. As with a delivery confirmation protocol such as TCP, if the switches between stepping stones (e.g., SS1 and SS2) lose a packet (either because of bit errors or because of congestion loss), the packet is held by SS1 (the effective source endpoint) and retransmitted by SS1 until SS2 (the effective destination endpoint) accepts it.

In some embodiments, delivery confirmation is facilitated via information contained in the stepping stone headers. For example, The ACK field bit in stepping stone tunnel header information fields 804 may be employed to confirm delivery for one or more packets, with sequence numbers for the packet provided in either a companion field or a field in tunnel header optional fields 806. Additionally, delivery confirmation may be implemented on a flow-basis through use of flow IDs and flow sequence numbers.

In one embodiment, tunnel flow sequence numbers are employed for a multiplexed flow as a whole (e.g., multiplexed flow of packets between stepping stones). Under one embodiment of this approach, when a source stepping stone retransmits a packet for a flow because it was refused, it will have a different sequence number than when it was first transmitted.

For example, suppose stepping stone SS1 optimistically sends a packet for each flow in turn, not knowing if stepping stone SS2 will have buffer space for that flow. SS2 sends back ACKs that have information like "sequence numbers 17-37 received and accepted. Sequence number 38 received but no buffer space for that flow. Sequence numbers 39-51 received and accepted. Sequence number 52 appears lost. Sequence numbers 53-57 received and accepted. Sequence number 58 received but no buffer space for that flow." When the packet corresponding to sequence number 38 is retransmitted, the sequence number for the multiplexed flow may have advanced, say to sequence number 79, in which case the retransmitted packet will have sequence number 79.

In addition to the foregoing flow control approaches, other flow control techniques may be implemented. For example, in one embodiment flow control in advance is implemented. For example, SS2 tells SS1 "as of sequence number 17 between us, I have room for 3 packets for flow 1, 7 packets for flow 2, 0 packets for flow 3, . . . ." This type of information could be conveyed in the payload of a stepping stone packet, wherein the header would identify the purpose of the packet (e.g., advance flow control). Moreover, hybrid approaches may also be implemented. For example, in one embodiment SS1 is allowed to send to SS2 even if SS2 has not explicitly said there are credits for that flow, or if SS2's last credit report to SS1 indicates it won't have buffer space. If SS1 is overly optimistic, SS2 will reject it. But perhaps, given the delay for information from SS2 to SS1, buffer space might be available.

As may be readily observed, the loss of bandwidth due to packet dropping/losses under conventional packet forwarding is reduced when compared with the Hop-by-Hop approach with delivery verification performed by stepping stones. First, consider the paths between pairs of stepping stones to comprise tunneled sub-paths. If a delivery verification mechanism is implemented between stepping stones, the longest portion of a route that would need to be re-traversed (to resend a dropped or lost packet) would be between a pair of stepping stones. In addition, since the stepping stones have greater buffer resources, the occurrence of packet dropping is substantially reduced. Moreover, under the flow management and multiplexing schemes that may be implemented by stepping stones, the packet/flow management workload on the intermediate conventional switches between stepping stones may also be substantially reduced, since only a single or a few flows need to be managed.

Network Topology Discovery and Configuration for Stepping Stone Switches

An aspect for deploying a network employing stepping stone switches is network topology discovery and associated configuration of stepping stone switches. As discussed above, a stepping stone switch may be implemented at two separate hierarchical levels in the network architecture—a first level corresponding to use as a conventional switch, and a second level corresponding to use as a stepping stone switch. In accordance with implementation of aspects at both of these levels, various techniques may be employed to discover the network topology at each level and configure a stepping stone switch such that it is aware of the network topology at each level.

In one embodiment, the node and link structure of the network at each of the two hierarchical levels is determined using conventional techniques, such as via one or more advertising schemes or using a central manager or the like. For example, stepping stone switches may exchange configuration packets with peer switches using a link-state routing protocol (thus advertising their configurations to one another), wherein link and node configuration information for the switches is propagated throughout the network. This is a technique that is employed for conventional switches to determine network topology, and similar techniques may be employed by the stepping stone switches to facilitate configuration at the first level. A link-state routing protocol technique may be extended to support exchange of configuration information at the second level, whereby the configuration and capabilities of stepping stone switches is made available to the other stepping stone switches. The net result is that a stepping stone has a "view" of the network architecture at each of the first and second hierarchical levels.

In one embodiment, stepping stone switches build and maintain forwarding tables based on the network topology at both hierarchical levels. For example, this may be performed using a unified forwarding table or separate forwarding tables for each level. Typically, if implemented as a unified forwarding table, forwarding data for the two hierarchical levels may be logically separated. The selection of which forwarding table (or portion of a forwarding table) to use will be based on whether or not stepping stone forwarding is to be used for a given packet.

Exemplary Stepping Stone Switch Hardware Architecture

Figure 9:
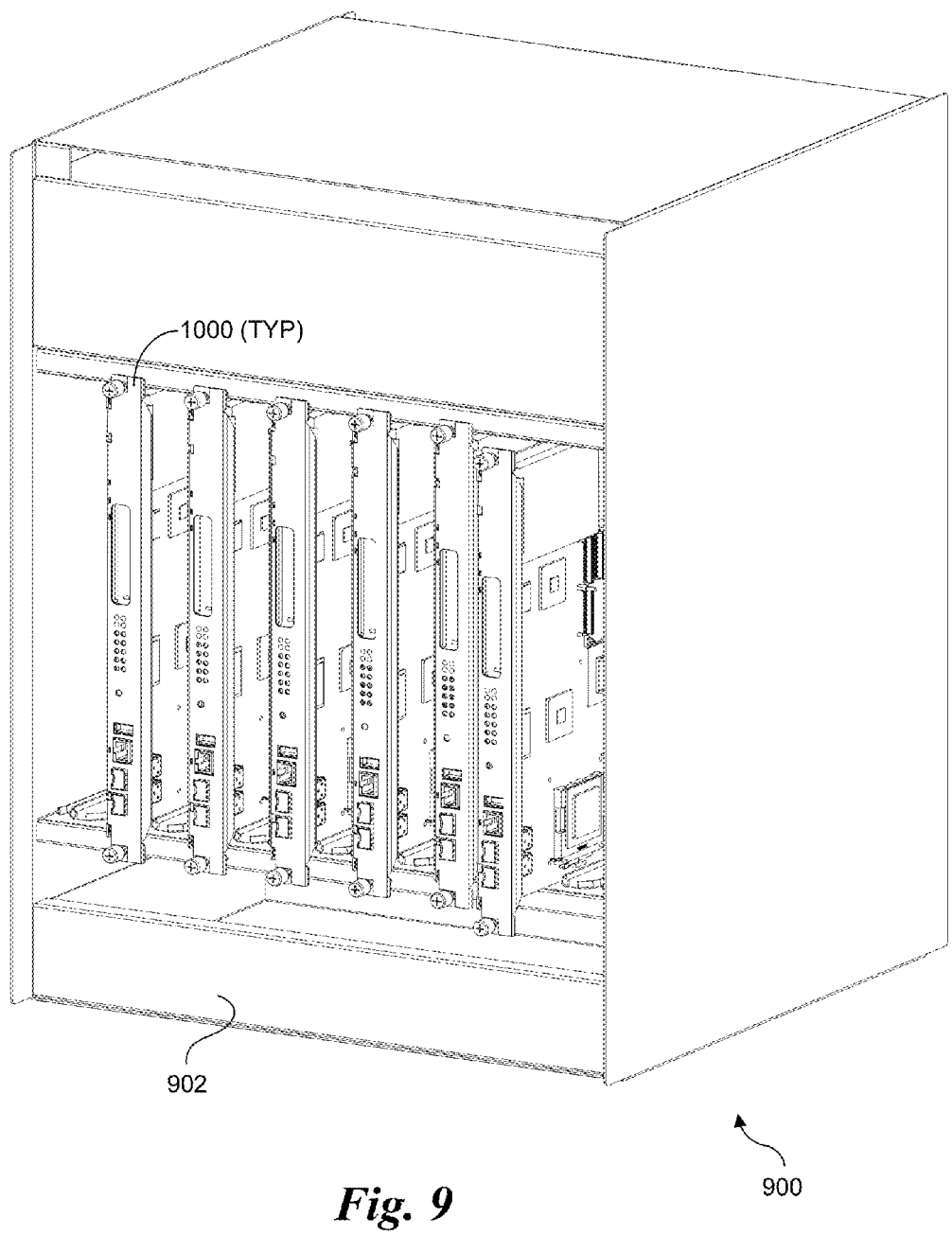
FIG. 9 shows an exemplary switch including a plurality of switch line cards configured as stepping stone switch apparatus.
Figure 10:
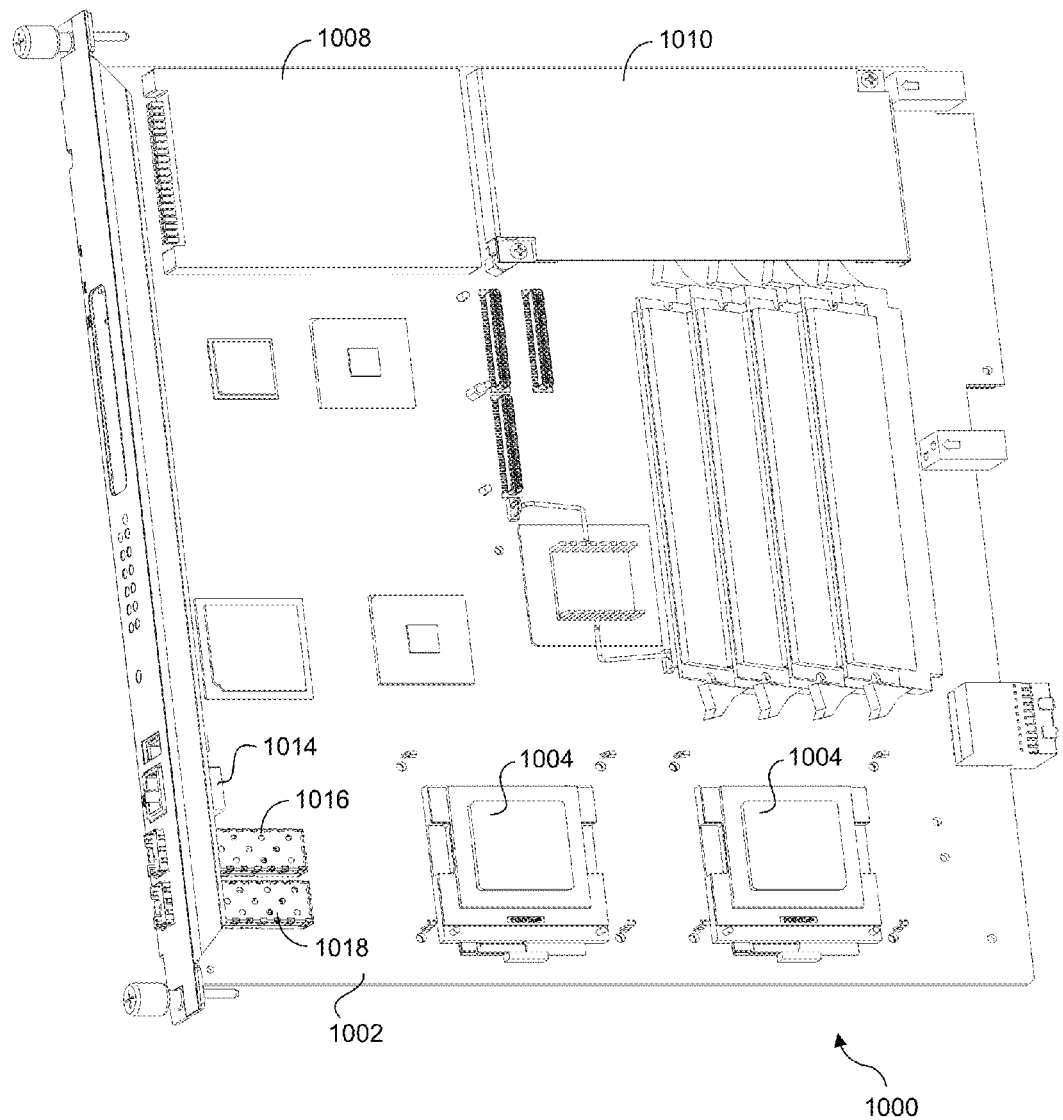
FIG. 10 shows an exemplary switch line card configured as a stepping stone switch apparatus.

FIGS. 9 and 10 respectively show a switch 900 and switch line card 1000 that are illustrative of components employed in one embodiment of a stepping stone switch. Switch 900 comprises a chassis 902 in which a plurality of switch line cards 1000 are installed in respective slots. For simplicity, the switch line cards 1000 illustrated in FIG. 10 are depicted as having the same configuration; however, one of skill in the art will recognized line cards having different configuration may be employed in the same switch chassis.

As shown in FIG. 10, switch line card 1000 includes a main board 1002 on which a plurality of components are mounted or otherwise coupled via a socketed connection, including one or more processors 1004 and memory modules 1006. Also shown coupled to main board 1002 are a mass storage device 1008 and a daughter board 1010. Mass storage device 1008 may typically comprise a hard disk drive or a solid state drive. Daughter board 1010 exemplifies various types of boards or modules that may be coupled to main board 1002 to provide auxiliary functions, and is optional. Main board 1002 further includes a connector 1012 that is coupled to a backplane in switch chassis 902 (not shown) when the switch line card is installed in its slot. The backplane is configured to enable the switch line cards to communicate with one another and with other facilities in the switch. Switch line card 1000 also includes various connectors for coupling to network links, such as depicted by an RJ-45 connector 1014 and optical connectors 1016 and 1018.

The operations and logic implemented by embodiments of the stepping stone switches disclosed herein may typically be implemented via instructions, such as software and/or firmware instructions, executed on one or more of processors 1004 or other processing components or logic on switch line card 1000. In various embodiments, processors 1004 may comprise general purpose processors including single core and multi-core processors, or may comprise special-purpose processors, such as network processors that are configured to facilitate packet-processing using a pipelined architecture.

Switch 900 is illustrative of a stepping stone switch configuration for a stepping stone that is implemented in a large scale network. However, this is not to be limiting, as switch apparatus with more simplified configurations may be implemented in other types of networks, such as Ethernet Local Area Networks (LANs) and Wide Area Networks (WANs). In addition, stepping stone switches may be implemented in other types of networks, including but not limited to Infiniband networks, as well as storage networks employing standardized or proprietary network protocols. For example, such a switch apparatus would typically include components similar to that shown for switch line card 1000, which is illustrative of one embodiment of a stepping stone switch apparatus. Thus, a standalone stepping stone switch may comprise a main board on which various components are mounted or otherwise operatively coupled including one or more processors, memory, storage device(s), input and output ports, with the storage device(s) storing instructions configured to be executed by the one or more processors to facilitate stepping stone operations.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software or firmware executed by a processor on a network switch. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:

receiving, at a first switch comprising a first type of switch, a packet having an original format including an original packet header corresponding to a network forwarding protocol including a destination address for a destination endpoint device communicatively coupled to a network including a plurality of a first type of switches interspersed with a plurality of a second type of switches;

determining a route from the first switch to the destination endpoint device that is forwarded through a sub-path between the first switch and a second switch comprising the first type of switch, the sub-path including at least one intermediate switch between the first and second switches comprising the second type of switch, at least one of the first and second switches being an interior switch in the network;

prepending a second packet header to the original packet format to form a new packet, the second packet header including a source address corresponding to an address for the first switch and a destination address corresponding to an address for the second switch, the second packet header having a format corresponding to the network forwarding protocol;

forwarding the new packet from the first switch toward a first intermediate switch along the sub-path via a link coupled between the first switch and the first intermediate switch;

receiving, at the first switch, a second packet that has been forwarded from a third switch to the first switch along a second sub-path, the second packet including a tunnel header that was prepended by the third switch comprising the first type of switch; and stripping the tunnel header from the second packet, wherein the tunnel header includes a first portion comprising a network forwarding protocol header, and a second portion comprising one or more header information fields containing data including one or more of a Sequence No, Flow ID, Flow Sequence No., ACK, Credit, Refuse, Pause, and Resume, and wherein the first type of switches have greater memory buffer capacity than the second type of switches and wherein the first type of switches employ a reliable protocol that facilitates error recovery for sub-paths between the first type of switches.

2. The method of claim 1, wherein the one or more header information fields are included in a packet payload for the new packet.

3. The method of claim 1, further comprising: receiving a plurality of packets at the first switch;
assigning packets among the plurality of packets to associated packet flows, the associated packet flows comprising a plurality of flow classes; and
forwarding packets associated with the plurality of packet flows as a multiplexed flow that is tunneled via the sub-path between the first and second switches.

4. The method of claim 3, further comprising:
receiving, at the first switch, a first packet flow credit grant from the second switch associated with a packet flow;
forwarding a number of packets corresponding to the packet flow credit grant and associated with the packet flow from the first switch to the second switch via the sub-path; and
waiting to forward additional packets associated with the packet flow until a second packet flow credit grant associated with the packet flow is received.

5. The method of claim 3, further comprising:
sending packets from the first switch via the sub-path to the second switch using a round robin-based scheme under which each flow class is allocated a turn for each round;
receiving, at the first switch, an indication from the second switch that a packet for a given flow has been refused; and
resending the packet that is refused during a subsequent turn for the given flow.

6. The method of claim 3, further comprising:
sending packets from the first switch via the sub-path to the second switch using a round robin-based scheme under which each flow class is allocated a turn for each round;
receiving, at the first switch, a pause request from the second switch requesting sending of packets corresponding to a flow identified in the pause request be paused; and
skipping the turn for the flow identified in the pause request until a resume request for the flow has been received from the second switch.

7. The method of claim 3 further comprising forwarding packets optimistically from the first switch via the tunneled sub-path to the second switch.

8. The method of claim 3, further comprising:
receiving an indication from the second switch to effect backpressure for an individual flow class; and
throttling a transmission rate for the individual flow class at the first switch.

9. The method of claim 1, wherein the first and second switches are configured to facilitate confirmed packet delivery, the method further comprising: sending a packet from the first switch to the second switch;
incurring a timeout period during which an ACK packet indicating the packet has been successfully received at the second switch has not been received at the first switch; and resending the packet from the first switch to the second switch, wherein the ACK packet includes a header including an ACK indicia.

10. The method of claim 1, further comprising:
sending a sequence of packets from the first switch to the second switch; receiving, at the first switch, a single packet sent from the second switch indicating sequence numbers of one or more packets in the sequence that were refused by the second switch; and
resending the one or more packet in the sequence that were refused with new sequence numbers.

11. The method of claim 1, wherein the network forwarding protocol comprises an Internet Protocol.

12. The method of claim 1, wherein the network forwarding protocol comprises an Ethernet Protocol.

13. The method of claim 1, wherein the network forwarding protocol comprises an Infiniband protocol.

14. A switch apparatus, configured to be implemented as a first switch comprising a first type of switch in a network comprising a plurality of first type of switches interspersed with a plurality of intermediate network elements not comprising the first type of switch, the switch apparatus comprising:
a main board having a plurality of components operatively coupled thereto, including, at least one processor; memory; a plurality of input and output ports; and at least one storage device having instructions stored therein configured to be executed by the at least one processor to cause the switch apparatus to perform operations, when operated in the network, comprising:
receiving, at an input port from a first one of an intermediate network element or an edge switch, a packet having an original format including a first packet header corresponding to a network forwarding protocol employed by the network and including a destination address corresponding to a destination endpoint device communicatively coupled to the network;
determining a route from the switch apparatus to the destination endpoint device that is forwarded through a sub-path between the switch apparatus and a second switch comprising the first type of switch, the sub-path including at least one intermediate network element between the switch apparatus and the second switch;
prepending a second packet header to the original packet format to form a new packet, the second network protocol packet header including a source address corresponding to an address for the switch apparatus and a destination address corresponding to an address for the second switch, wherein at least a portion of a format for the second packet header corresponds to a packet header for the network forwarding protocol;
forwarding the new packet from the first switch toward a first intermediate switch along the sub-path via a link coupled between the first switch and the first intermediate switch;
receiving, at an input port from a second one of an intermediate network element or an edge switch, a second packet that has been forwarded along a second sub-path, the second packet including a tunnel header that was prepended by the second one of an intermediate network element or an edge switch; and
stripping the tunnel header from the second packet,
wherein the tunnel header includes a first portion comprising a network forwarding protocol header, and a second portion comprising one or more header information fields containing data including one or more of a Sequence No., Flow ID, Flow Sequence No., ACK, Credit, Refuse, Pause, and Resume.

15. The switch apparatus of claim 14, wherein the instructions, when executed by the at least one processor, are configured to perform further operations comprising:
receiving a plurality of packets at one or more input ports;

assigning packets among the plurality of packets to associated packet flows, the associated packet flows comprising a plurality of flow classes; and forwarding packets associated with the plurality of packet flows as a multiplexed flow that is tunneled via the sub-path between the switch apparatus and the second switch.

16. The switch apparatus of claim 15, wherein the instructions, when executed by the at least one processor, are configured to perform further operations comprising:

receiving a first packet flow credit grant from the second switch associated with a packet flow;

forwarding a number of packets corresponding to the packet flow credit grant and associated with the packet flow from the switch apparatus to the second switch via the sub-path; and waiting to forward additional packets associated with the packet flow until a second packet flow credit grant associated with the packet flow is received.

17. The switch apparatus of claim 15, wherein the instructions, when executed by the at least one processor, are configured to perform further operations comprising:

sending packets via the sub-path to the second switch using a round robin-based scheme under which each flow class is allocated a turn for each round;

receiving an indication from the second switch that a packet for a given packet flow has been refused; and resending the packet that is refused during a subsequent turn for the given packet flow.

18. The switch apparatus of claim 15, wherein the instructions, when executed by the at least one processor, are configured to perform further operations comprising:

sending packets via the sub-path to the second switch using a round robin-based scheme under which each flow class is allocated a turn for each round;

receiving a pause request from the second switch requesting sending of packets corresponding to a flow identified in the pause request be paused; and skipping the turn for the packet flow identified in the pause request until a resume request for the packet flow has been received from the second switch.

19. The switch apparatus of claim 15, wherein the instructions, when executed by the at least one processor, are configured to perform further operations comprising forwarding packets optimistically from the switch apparatus via the tunneled sub-path to the second switch.

20. The switch apparatus of claim 15, wherein the instructions, when executed by the at least one processor, are configured to perform further operations comprising:

receiving an indication from the second switch to effect backpressure for an individual flow class; and throttling a transmission rate for the individual flow class at the switch apparatus.

21. The switch apparatus of claim 15, wherein the second packet header comprises a tunnel header including a first portion comprising a network forwarding protocol header, and a second portion comprising one or more header information fields.

22. The switch apparatus of claim 21, wherein the switch apparatus and the second switch are configured to facilitate confirmed packet delivery, and wherein the instructions, when executed by the at least one processor, are configured to perform further operations comprising: sending a packet to the second switch via the sub-path;

incurring a timeout period during which an ACK packet indicating the packet has been successfully received at the second switch has not been received at the switch apparatus; and resending the packet to the second switch via the sub-path, wherein the ACK packet includes a tunnel header including an ACK indicia.

23. The switch apparatus of claim 15, wherein the switch apparatus and the second switch are configured to facilitate confirmed packet delivery, and wherein the instructions, when executed by the at least one processor, are configured to perform further operations comprising:

sending a sequence of packets from the switch apparatus to the second switch;

receiving, at the switch apparatus, a single packet sent from the second switch indicating sequence numbers of one or more packets in the sequence that were refused by the second switch; and resending the one or more packet in the sequence that were refused with new sequence numbers.

* * * * *